(12) United States Patent
Yamamoto et al.

(10) Patent No.: US 7,365,940 B2
(45) Date of Patent: Apr. 29, 2008

(54) HARD DISK DRIVE DEVICE, AND FLUID DYNAMIC BEARING SPINDLE MOTOR AND ASSEMBLING METHOD THEREOF

(75) Inventors: Takeyoshi Yamamoto, Niihama (JP); Yasunori Tokuno, Saijyo (JP); Hiroaki Saito, Ozu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 410 days.

(21) Appl. No.: 11/167,126

(22) Filed: Jun. 28, 2005

(65) Prior Publication Data

US 2006/0002011 A1    Jan. 5, 2006

(30) Foreign Application Priority Data

Jun. 30, 2004   (JP) .............................. 2004-193395

(51) Int. Cl.
*G11B 17/02* (2006.01)
*F16C 32/06* (2006.01)
*H02K 5/16* (2006.01)
*H02K 7/08* (2006.01)

(52) U.S. Cl. ...................... 360/99.08; 384/107; 310/90

(58) Field of Classification Search ................ 384/107, 384/100, 112, 114, 121; 360/99.08, 98.07, 360/99.04; 310/67 R, 90
See application file for complete search history.

(56) References Cited

U.S. PATENT DOCUMENTS

| | | | | |
|---|---|---|---|---|
| 5,623,382 A | * | 4/1997 | Moritan et al. | 360/99.08 |
| 6,246,136 B1 | * | 6/2001 | Ichiyama | 310/90 |
| 6,493,181 B1 | * | 12/2002 | Ichiyama | 360/99.08 |
| 7,284,910 B2 | * | 10/2007 | Dittmer et al. | 384/132 |
| 2003/0174915 A1 | * | 9/2003 | Parsoneault et al. | 384/110 |
| 2003/0185473 A1 | * | 10/2003 | Gomyo et al. | 384/107 |
| 2005/0218735 A1 | * | 10/2005 | Herndon et al. | 310/90 |

FOREIGN PATENT DOCUMENTS

| | | | | |
|---|---|---|---|---|
| JP | 61252915 A | * | 11/1986 |
| JP | 02021022 A | * | 1/1990 |
| JP | 10108407 A | * | 4/1998 |
| JP | 2000186717 A | * | 7/2000 |
| JP | 2003-35311 | | 2/2003 |
| JP | 2003-097546 | | 4/2003 |

OTHER PUBLICATIONS

English language Abstract of JP 2003-097546.
English language Abstract of JP 2003-035311.

* cited by examiner

*Primary Examiner*—William J Klimowicz
(74) *Attorney, Agent, or Firm*—Greenblum & Bernstein, P.L.C.

(57) ABSTRACT

A hydrodynamic bearing for a hard disk drive device is disclosed. An oil is filled in a clearance between an inner surface of the hub and an outer surface of the shaft, whereby a hydrodynamic radial bearing is formed between the inner periphery of the hub and the outer periphery of the shaft, and a hydrodynamic thrust bearing is formed between the top face of the shaft and the thrust plate. Between an outer peripheral part at the base end of the shaft and an inner peripheral part at the open end of the hub is formed a seal part in which a larger clearance is formed between the shaft and the hub than a clearance in the hydrodynamic radial bearing and in which the oil surface is positioned. An oil surface adjusting hole and a plug for sealing the hole are provided in the case opposite the seal part.

22 Claims, 6 Drawing Sheets

HARD DISK DRIVE DEVICE, AND FLUID DYNAMIC BEARING SPINDLE MOTOR AND ASSEMBLING METHOD THEREOF

The present disclosure relates to subject matter contained in priority Japanese Patent Application No. 2004-193395 filed on Jun. 30, 2004, the contents of which is herein expressly incorporated by reference in its entirety.

BACKGROUND OF THE INVENTION

1. Field of the Invention

The invention relates to a hard disk drive device, and a fluid dynamic bearing spindle motor that can be designed small and thin, and an assembling method thereof.

2. Description of the Related Art

Desktop or notebook personal computers are currently the main application of hard disk drive devices. Depending on the future market trend, however, hard disk drive devices may be employed in small portable electronic devices such as mobile phones, card memories and the like. There will then be a high demand for small, thin, and low-cost hard disk drive devices.

FIG. 5 shows one conventional hard disk drive device. The case 51 includes a cylindrical boss 52 and an annular recess 53 around the boss 52 for accommodating a motor. The lower end of a cylindrical sleeve 54 fits in the cylindrical boss 52. The sleeve 54 accommodates a shaft 55 inside, with a radial bearing 56 provided therebetween. A large diameter hole 57 is formed in the lower end of the sleeve 54, which is tightly closed by a plate 58. The shaft 55 includes a flange 59 at the lower end, which is accommodated inside the large diameter hole 57 such as to be rotatable. Thrust bearings 60 are provided between the upper face of the flange 59 and the opposing stepped surface of the hole 57 and between the lower face of the flange 59 and the opposing plate 58.

The radial bearing 56 and the thrust bearings 60 are hydrodynamic bearings with surfaces having hydrodynamic pressure generating grooved. Oil or a lubricating fluid is filled in the small continuous clearance extending from the radial bearing 56 to the thrust bearings 60. In the upper part of the radial bearing 56 is formed a tapered surface where the inside diameter of the shaft 55 decreases upwards to form a tapered seal part 61. The oil surface is positioned in this seal part 61 so as to prevent oil leakage by surface tension.

The top of the shaft 55 protrudes from the top of the sleeve 54, and to this protruded part is fixedly attached the center of a generally hat-shaped hub 62. A hard disk (not shown) is fixedly mounted on an outer peripheral flange 63 protruding from the bottom on the outside of the hub 62. An annular rotor 64 of a motor 66 is fixedly attached below the outer peripheral flange 63, while a stator 65 is fixedly attached on the outer periphery of the cylindrical boss 52.

FIG. 6 shows another conventional hard disk drive device (see Japanese Patent Laid-Open Publication No. 2003-97546). The case 71 has a recess 72 for accommodating a motor. A base member 73 is fixedly fitted in the center of the recess. The base member 73 has an L-shape cross section with a protruding part 73a at the outer periphery. A flange 73b extends to the outside from the top of the protruding part 73a. A shaft 74 stands in the center of the base member 73. A bottomed cylindrical hub 75, or a cylindrical sleeve with a thrust plate 76 for closing its top end, is coupled from above onto the shaft 74.

A radial bearing 77 is provided between the shaft 74 and the hub 75. A thrust bearing 78 is provided between the bottom face of the hub 75 and the base member 73. A hydrostatic thrust bearing 79 is provided between the top face of the shaft 74 and the thrust plate 76. The hub 75 has a small diameter part at the bottom and a taper is formed on its outer surface such that the diameter decreases upwards. This tapered surface and the inner periphery of the protruded part 73a of the base member 73 form a tapered seal part 80, in which the oil surface is positioned so as to prevent oil leakage by surface tension. A retention ring 81 is fixed to the bottom at the outer periphery of the hub 75. The ring has an L-shape cross section and engages with the flange 73b for preventing the hub 75 from slipping out.

An annular rotor 82 of a motor 84 is fixedly attached around the lower part of the hub 75, while a stator 83 is fixedly mounted in the outer peripheral part of the recess 72.

FIG. 7 shows yet another conventional hard disk drive device (see Japanese Patent Laid-Open Publication No. 2003-35311). The case 91 has a recess 92 for accommodating a motor, and a truncated conical shaft 93 is fixedly fitted in the center of the recess 92. A permanent magnet 94 is disposed in the upper central part of the shaft 93 such that its position is adjustable. An inverted cup-shaped hub 95 is coupled on the truncated conical shaft 93, and a conical hydrodynamic air bearing 96 is formed between the shaft 93 and the hub 95.

An annular rotor 97 of a motor 99 is fixedly attached around the lower part of the hub 95, while a stator 98 is fixedly mounted in the outer peripheral part of the recess 92.

In the configuration shown in FIG. 5, the shaft 55 has the flange 59 at one end and the seal part 61 at the other end, the sleeve 54 is fitted on the shaft 55, and the hub 62 is mounted on the sleeve 54. Because of this complicated structure, the device has large dimensions both in the axial and radial directions of the shaft 55, making size, thickness, and cost reduction impossible.

With the configuration disclosed in Japanese Patent Laid-Open Publication No. 2003-97546 shown in FIG. 6, the hub 75 is directly fitted onto the shaft 74 to serve as a sleeve for the radial bearing 77 and the thrust bearing 78 between the bottom face of the hub 75 and the base member 73. However, the outer peripheral retention ring 81 at the bottom of the hub 75 for retaining the hub 75 is the cause of the large diameter of the hub 75 and an obstacle to reducing the size. The provision of the base member 73 which is separate from the case 71 and the retention ring 81 increases the number of components and makes the configuration complex. The difficulty in achieving sufficient assembling precision makes size and cost reduction impossible.

With the configuration disclosed in Japanese Patent Laid-Open Publication No. 2003-35311 shown in FIG. 7, because the hub 95 is supported by the hydrodynamic air bearing 96, the conical shaft 93 needs to have a diameter that is large enough to achieve necessary bearing rigidity, which imposes a limitation on the extent of size reduction. One possible solution would be to employ an oil bearing instead of the air bearing, but in that case, a reliable seal part for preventing oil leakage is necessary. However, the mere substitution of oil for air as the lubricating fluid would not lead to size, thickness, and cost reduction of the device since there is no indication, nor suggestion, in this publication as to a specific configuration for a simple seal part that can be formed without increasing the number of components.

SUMMARY OF THE INVENTION

In view of the above problems in the conventional techniques, an object of the present invention is to provide a hard disk drive device and a fluid dynamic bearing spindle motor that can be designed small, thin, and at low-cost, and their assembling method.

To achieve the above object, a hard disk drive device of the invention includes a case with an upright shaft, and a cylindrical hub coupled to the shaft, one end of the hub being closed by a thrust plate so that the hub has a bottomed cylindrical shape, a hard disk being fixedly mounted on an outer peripheral part of the hub. An oil is filled in a clearance between an inner surface of the hub and an outer surface of the shaft, whereby a hydrodynamic radial bearing is formed between the inner periphery of the hub and the outer periphery of the shaft, and a hydrodynamic thrust bearing is formed between the top face of the shaft and the thrust plate. Between an outer peripheral part at the base end of the shaft and an inner peripheral part at the open end of the hub is formed a seal part in which a larger clearance is formed between the shaft and the hub than a clearance in the hydrodynamic radial bearing and in which the oil surface is positioned. An oil surface adjusting hole and a plug for sealing the hole are provided in the case opposite the seal part. A motor for rotating the hub is disposed between the outer peripheral part at the open end of the hub and the case. The hub and the thrust plate may be separate components coupled together, or they may be a one-piece component.

A fluid dynamic bearing spindle motor of the invention includes a base with an upright shaft, and a bottomed cylindrical sleeve coupled to the shaft, an oil being filled in a clearance between an inner surface of the sleeve and an outer surface of the shaft to form a hydrodynamic radial bearing between the inner periphery of the sleeve and the outer periphery of the shaft and a hydrodynamic thrust bearing between a top face of the shaft and an inner bottom face of the sleeve. Between an outer peripheral part at the base end of the shaft and an inner peripheral part at the open end of the sleeve is formed a seal part in which a larger clearance is formed between the shaft and the sleeve than a clearance in the hydrodynamic radial bearing and in which the oil surface is positioned. An oil surface adjusting hole and a plug for sealing the hole are provided in the base opposite the seal part. A motor for rotating the sleeve is disposed between the outer peripheral part at the open end of the sleeve and the base.

With this configuration, the hydrodynamic radial bearing is formed between the shaft and the bottomed cylindrical hub or sleeve coupled on the shaft, and the hydrodynamic thrust bearing is formed between the top face of the shaft and the inner bottom face of the hub or sleeve. As the shaft and the hub or sleeve together form the oil bearings, the hard disk drive device or spindle motor is designed small and thin, while having necessary bearing rigidity. For stable bearing operation, the oil surface must be properly adjusted in the seal part at the end of the hydrodynamic radial bearing. With the above configuration, the simple oil surface adjusting hole and the plug for sealing the hole ensure successful bearing performance with high reliability.

A method for assembling a hard disk drive device of the invention includes the steps of: dropping an oil onto a top face of a shaft standing on a case; coupling a hub onto the shaft, the hub having a bottomed cylindrical shape with a thrust plate closing its one end, and a hard disk being fixedly mounted on an outer peripheral part of the hub; adjusting oil surface by sucking the oil through an adjusting hole formed in the case near the shaft; and sealing the adjusting hole.

A method for assembling a fluid dynamic bearing spindle motor of the invention includes the steps of: dropping an oil onto a top face of a shaft standing on a base; coupling a bottomed cylindrical sleeve onto the shaft; adjusting oil surface by sucking the oil through an adjusting hole formed in the base near the shaft; and sealing the adjusting hole.

This method enables easy and efficient assembling of a hard disk drive device or a fluid dynamic bearing spindle motor.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Preferred embodiments of the hard disk drive device of the present invention will be hereinafter described with reference to FIG. 1 to FIG. 4D.

First Embodiment

Figure 1:
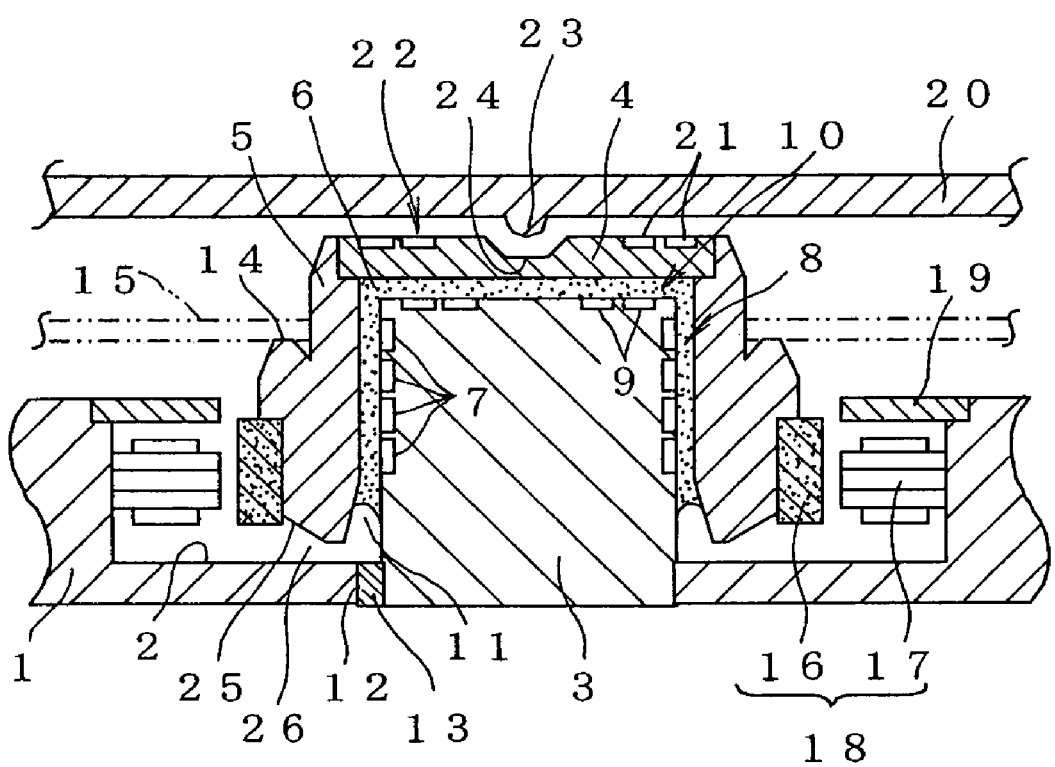
FIG. 1 is a longitudinal cross-sectional view illustrating chief elements of a hard disk drive device according to a first embodiment of the invention.

FIG. 1 shows a first embodiment of a hard disk drive device. A case 1 has a circular recess 2 for accommodating a motor, and a shaft 3 stands in the center of the recess. The bottom of the shaft 3 may either be fixedly coupled to the case 1, or formed in one piece with the case 1. A cylindrical hub 5, with a thrust plate 4 closing its open top end, is coupled from above to the shaft 3, so that it serves as a bottomed cylindrical bearing sleeve. The thrust plate 4 may be formed in one piece with the hub 5. A lubricating fluid or oil 6 is filled in a small clearance formed between the shaft 3 and the hub 5.

The shaft 3 has herringbone grooves 7 or the like on the outer surface which generate hydrodynamic pressure on a cylindrical surface when rotated, to form a hydrodynamic radial bearing 8 between the shaft and the hub 5. The shaft 3 has spiral grooves 9 or the like in the top face that generate hydrodynamic pressure on a flat surface when rotated, to form a hydrodynamic thrust bearing 10 between the shaft end and the thrust plate 4, which forms the inner bottom face of the hub 5. The hub 5 has a tapered inner surface at the lower end, with the diameter increasing downwards to form a tapered seal part 11 between the hub 5 and the shaft 3. The free surface of the oil 6 is positioned in this seal part 11, so that the oil surface forms a meniscus by surface tension to prevent oil leakage. The seal part 11 need not necessarily be tapered and may be cylindrical such as to form a larger gap than the clearance in the hydrodynamic radial bearing 8. An oil surface adjusting hole 12 is provided in the case 1 opposite the seal part 11, and is sealed by a plug 13.

A step 14 is formed on the outer surface of the hub 5 in the middle in the axial direction, and a hard disk 15 is set on this step 14. The permanent magnet of the rotor 16 of a motor 18 is fixedly attached around the lower part of the hub 5 in the axial direction, while the stator 17 of the motor 18 is fixedly mounted to the inner surface of the recess 2. A shield plate 19 made of a ferromagnet is disposed such as to close the opening above the stator 17 in the outer peripheral part of the recess 2.

A case cover 20 for closing the top opening of the case 1 is slightly spaced apart from the top face of the hub 5 and the thrust plate 4. The thrust plate 4 has spiral grooves 21 or the like in the top face that generate hydrodynamic pressure on a flat surface when rotated, to form an hydrodynamic air bearing 22 for biasing the thrust plate 4 downwards toward the hydrodynamic thrust bearing 10. The case cover 20 includes a pivot 23 protruding from the lower face in a position corresponding to the axial center of the hub 5. The thrust plate 4 is formed with an indentation 24 in the center such that the tip of the pivot 23 is spaced apart from the bottom of the indentation 24. The hub 5 is thus retained by point contact engagement with the case cover 20. Instead of the above configuration, the pivot 23 and the indentation 24 may be provided in the thrust plate 4 and in the case cover 20, respectively.

The lower end of the hub 5 is slightly spaced apart from the case 1. The end face of the hub 5 opposite the case 1 includes an inclined end face 25 slanted radially upwards from inside to outside, to form a second tapered seal part 26 between the end face of the hub and the case 1.

With the above configuration, the shaft 3 and the hub 5 for supporting the hard disk 15 together complete the bearings; the hydrodynamic radial bearing 8 is formed between the shaft 3 and the bottomed cylindrical hub 5 coupled on the shaft 3, the hydrodynamic thrust bearing 10 is formed between the top face of the shaft 3 and the inner bottom face of the hub 5, and the oil seal part 11 is provided at one end of the hydrodynamic radial bearing 8. This configuration makes the device compact both in axial and radial directions of the shaft 3, and the simple configuration enables cost reduction. Further, the hydrodynamic bearings using oil 6 provide necessary bearing rigidity even with the compact configuration with a small diameter shaft. The present invention thus provides a small, thin, and low-cost hard disk drive device.

An appropriate oil surface adjustment in the seal part 11 is essential for stable bearing performance. However, filling a fixed amount of oil 6 in the radial and thrust bearings 8 and 10 will result in variations in the oil surface position in the seal part 11 because of the extremely small amount of oil 6 and because of accumulated tolerances of bearing parts. In the hard disk drive device of the invention, the adjusting hole 12 and the plug 13 for sealing the hole enable adjustment of the oil surface position in the seal part 11 after the bearings 8 and 10 are formed. Thus stable bearing performance is ensured.

The hydrodynamic air bearing 22 formed between the outer face of the thrust plate 4 and the case cover 20 spaced apart therefrom for biasing the hub 5 toward the case 1 as the hub 5 rotates ensure stable operation of the hydrodynamic thrust bearing 10 and prevent slip-out of the hub 5.

When the hub 5 lifts up, the thrust plate 4 makes point contact with the case cover 20 because of the pivot 23 on the cover 20 located in the axial center of the hub 5. The hub 5 is thus securely retained without being hindered from rotating, and is smoothly returned to its appropriate operating position.

The second seal part 26 formed between the inclined end face 25 formed in the end face of the hub 5 opposite the case 1 and the case 1 provides a fail-safe seal in the event of extremely high temperature exposure. Oil leakage trouble is thus reliably prevented.

Second Embodiment

Figure 2:
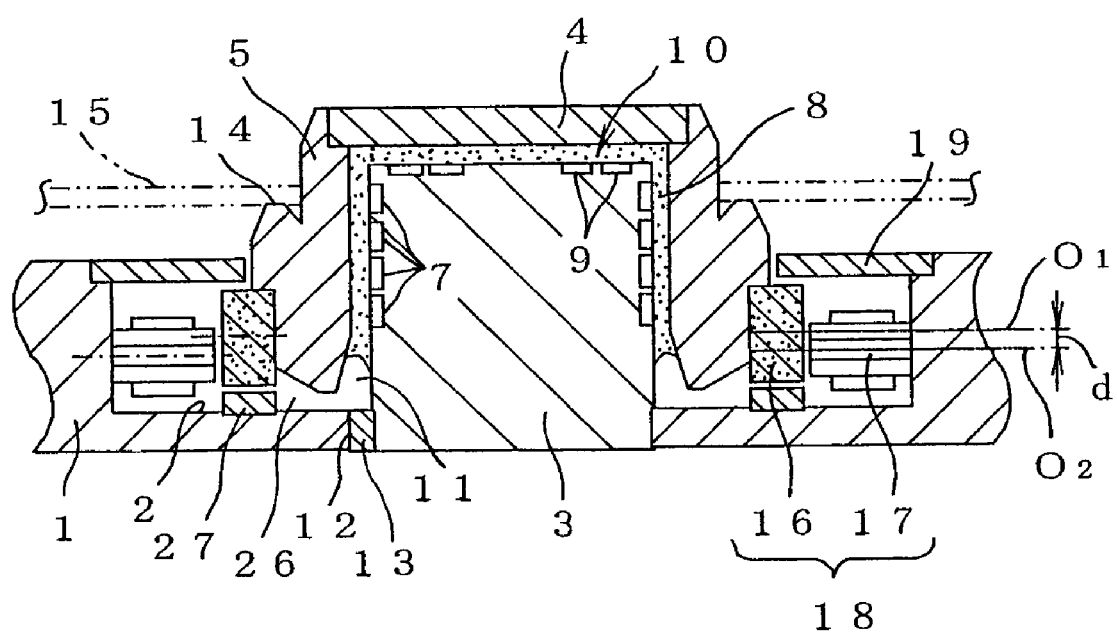
FIG. 2 is a longitudinal cross-sectional view illustrating chief elements of a hard disk drive device according to a second embodiment of the invention.

A second embodiment of the hard disk drive device of the invention is described next with reference to FIG. 2. Like elements are given the same reference numerals and the description will be made only of the difference between the second embodiment and the foregoing embodiment.

In this embodiment, as means of biasing the hub 5 toward the case 1, a ferromagnetic ring 27 is provided to use magnetic attraction. The ring 27 is disposed on the case 1 axially opposite the permanent magnet of the rotor 16, which is provided at the outer periphery near the open end of the hub 5. In addition, the magnetic center or axial midpoint $O_2$ of the stator 17 is axially offset from the magnetic center or axial midpoint $O_1$ of the permanent magnet of the rotor 16 by "d" toward the base end of the shaft 3 so as to bias the hub 5 toward the case 1 using the magnetic attraction of the stator 17. The provision of the ring 27 and the offset positioning of the rotor 16 and the stator 17 may both be adopted as in this embodiment, but only one of these will do.

The other difference is that, as means of retaining the hub 5 to the shaft 3, the shield plate 19 above the stator 17 has an inside diameter that is smaller than the outside diameter of either the permanent magnet of the rotor 16 or a plate interposed between the permanent magnet and the hub 5. The hub 5 is thus retained by engagement between the rotor 16 and the shield plate 19 in the axial direction.

With this configuration, the hub 5 is biased toward the case 1 by the magnetic attraction between the permanent magnet of the rotor 16 and the ring 27 as well as by the magnetic attraction between the permanent magnet of the rotor 16 and the axially offset stator 17 due to the offset positioning. Therefore, the position of the case cover 20 is not limited as with the previous embodiment for ensuring stable operation of the hydrodynamic thrust bearing 10 and for keeping the hub 5 from slipping out. The hub 5 is reliably retained to the shaft 3 by the shield plate 19 that can engage with the outer periphery of the rotor 16.

Third Embodiment

A third embodiment of the hard disk drive device and an assembling method thereof are described next with reference to FIG. 3 and FIGS. 4A to 4D.

Figure 3:
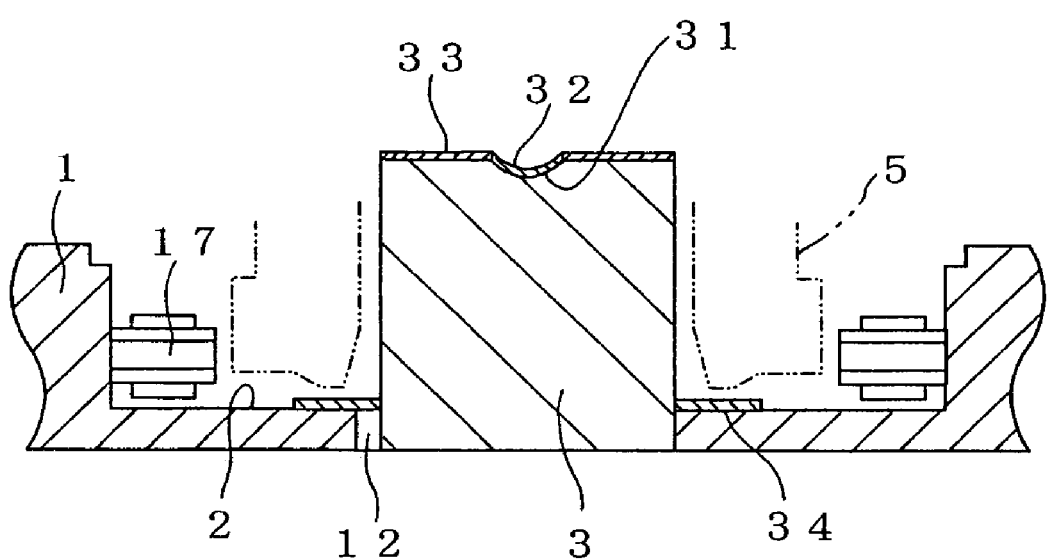
FIG. 3 is a longitudinal cross-sectional view illustrating a case and a shaft of a hard disk drive device according to a third embodiment of the invention.

In this embodiment, as shown in FIG. 3, a dent 31 is formed in the top face of the shaft 3. The dent 31 is provided with a coat 32 of a material having high wettability to the oil 6, while the other parts of the top face of the shaft 3 are provided with a coat 33 of a material having low wettability to the oil. Parts of the case 1 opposite the seal part 1 and the second seal part 26 are coated with an oil repellent 34.

Figure 4A:
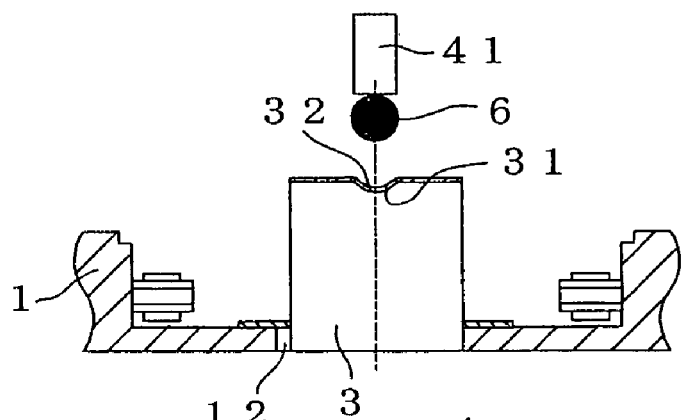
FIG. 4A to FIG. 4D are diagrams illustrating assembling processes of the hard disk drive device of the invention.
Figure 4B:
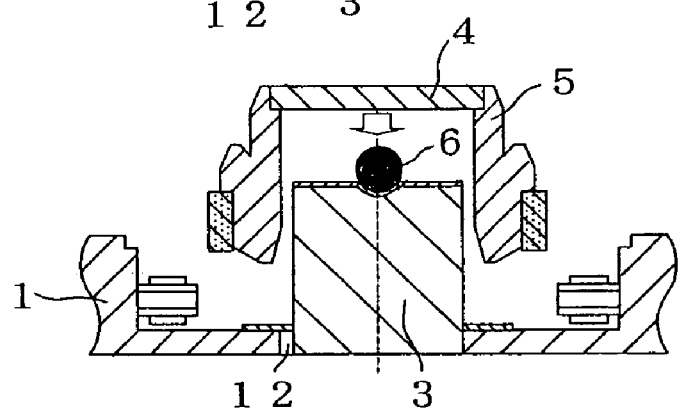
Figure 4C:
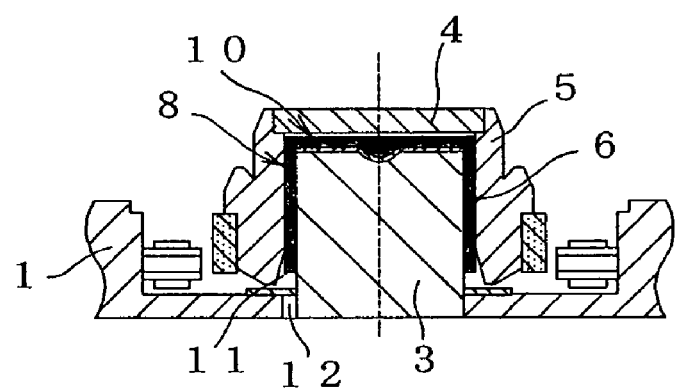
Figure 4D:
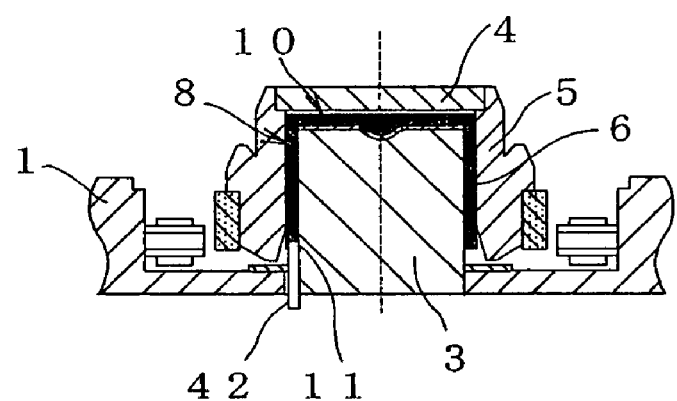
Figure 5:
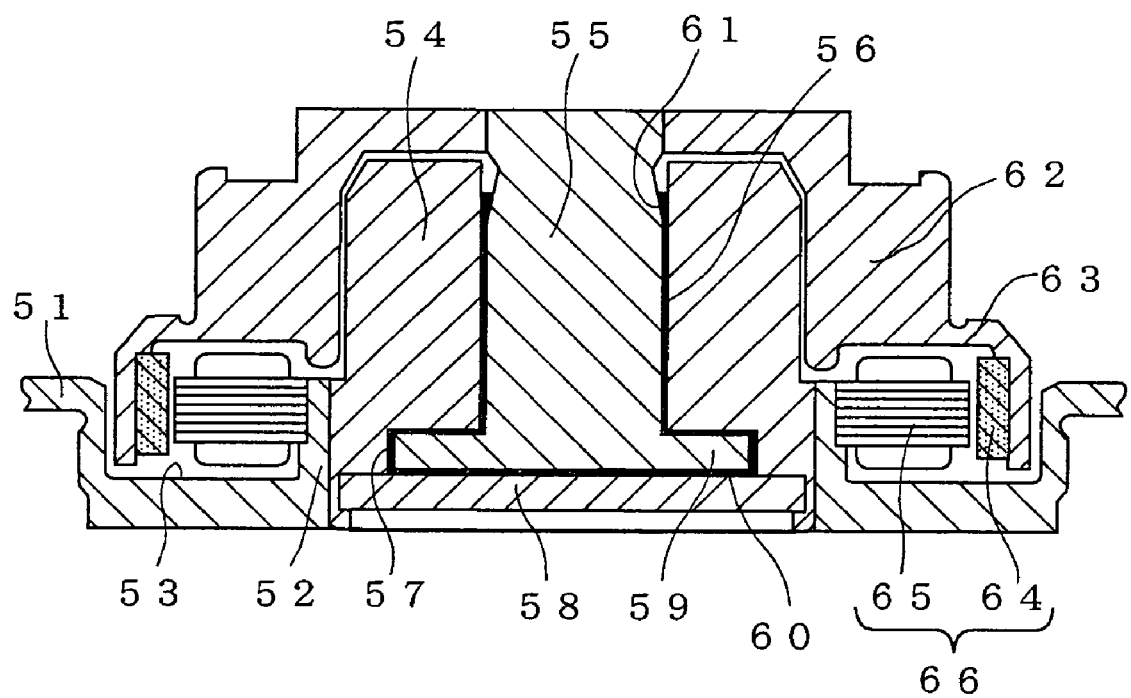
FIG. 5 is a longitudinal cross-sectional view illustrating chief elements of a first conventional hard disk drive device.
Figure 6:
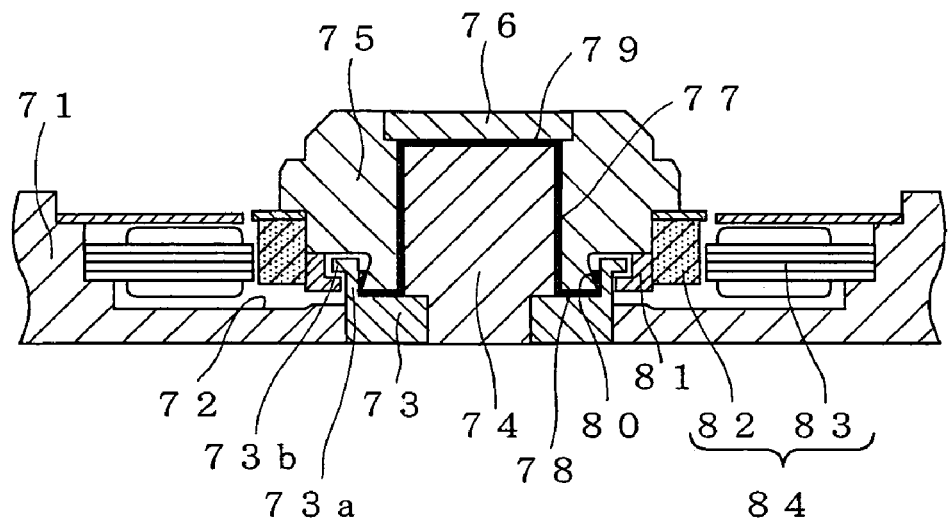
FIG. 6 is a longitudinal cross-sectional view illustrating chief elements of a second conventional hard disk drive device.
Figure 7:
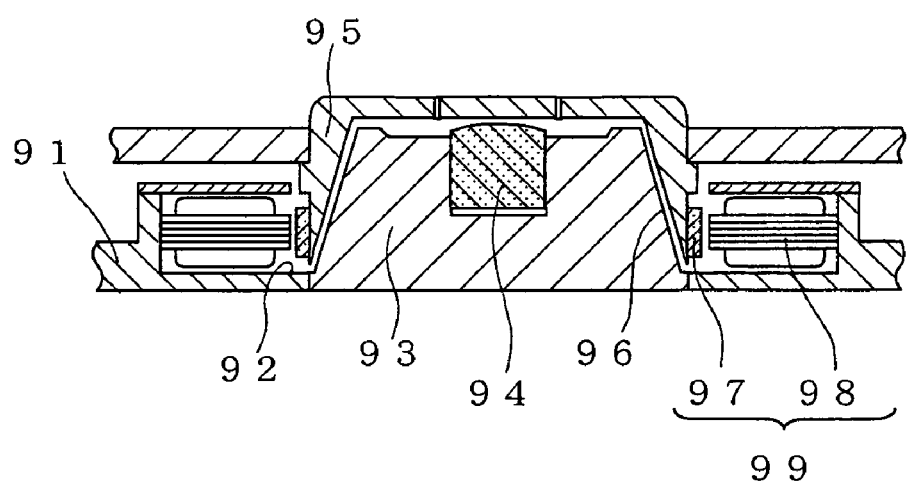
FIG. 7 is a longitudinal cross-sectional view illustrating chief elements of a third conventional hard disk drive device.

Referring now to FIGS. 4A to 4D, the hard disk drive device having the case 1 with the above-described shaft 3 is assembled as follows: First, the oil 6 is dropped onto the top face of the shaft 3 using a drop nozzle 41, as shown in FIG. 4A. As the oil 6 is dropped into the dent 31 in the top face of the shaft 3, it rests in the dent and does not flow out until the hub 5 is coupled onto the shaft 3. Oil retention is further ensured by the high oil-wettability coat 32 of the dent 31 and the low oil-wettability coat 33 of the other parts. Next, the bottomed cylindrical hub 5 with the thrust plate 4 closing one open end of the hub is coupled from above onto the shaft 3, as shown in FIG. 4B. The case 1 is then placed in a low pressure chamber to eliminate air contained in the bearings 8 and 10 between the shaft 3 and the hub 5. This coupling makes the oil 6 spread smoothly and entirely in the clearance between the shaft 3 and the hub 5, as shown in FIG. 4C. After that, the oil surface position is adjusted using a suction nozzle 42 for sucking the oil 6 inserted through the adjusting hole 12, as shown in FIG. 4D. The adjusting hole 12 is then sealed by the plug 13.

With this embodiment, the oil 6 is filled in the bearings 8 and 10 by coupling the bottomed cylindrical hub 5 onto the shaft 3 after dropping the oil 6 onto the top face of the shaft 3. The easy and efficient process of filling oil 6 in the bearings 8 and 10 enables smooth and efficient assembling process of the hard disk drive device.

The dent 31 in the top face of the shaft 3, together with the high oil-wettability coat 32 of the dent 31 and the low oil-wettability coat 33 of the other parts ensure retention of the oil 6 dropped in the dent 31 until the hub 5 is coupled. As the oil 6 is properly filled simply by coupling the hub 5, the hard disk drive device is smoothly assembled.

The oil repellent 34 applied on the parts of the case 1 opposite the seal part 11 and the second seal part 26 provides an effect of holding back the oil 6 oozed out of the seal parts 11 and 26 and prevents oil leakage. Oil that has oozed out and remained on the case 1 will evaporate, which leads to a decrease in the amount of oil, but the oil repellent 34 prevents such oil evaporation effectively.

While the above-described embodiments are described in the case of a hard disk drive device, the present invention is also applicable to a fluid dynamic bearing spindle motor with the same effects. In that case, the case 1 is designed as a base, while the hub 5 for supporting the hard disk is designed as a bearing sleeve so as to construct a rotation device.

As described above, according to the present invention, the shaft and the bottomed cylindrical hub or sleeve coupled onto the shaft together form a hydrodynamic radial bearing and a hydrodynamic thrust bearing using oil as a lubricant fluid, whereby the device is small and thin while having necessary bearing rigidity. Moreover, successful bearing performance is ensured with high reliability by the configuration which enables adjustment of oil surface position in the seal part at one end of the hydrodynamic radial bearing through an adjusting hole, which is sealed afterwards. These advantageous characteristics of the present invention are well suited for designing a small and thin hard disk drive device or a fluid dynamic bearing spindle motor.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A hard disk drive device comprising:
a case with an upright shaft; and
a cylindrical hub coupled to the shaft, one end of the hub being closed by a thrust plate so that the hub has a bottomed cylindrical shape, a hard disk being fixedly mounted on an outer peripheral part of the hub, wherein
an oil is filled in a clearance between an inner surface of the hub and an outer surface of the shaft, whereby a hydrodynamic radial bearing is formed between the inner periphery of the hub and the outer periphery of the shaft,
a hydrodynamic thrust bearing is formed between the top face of the shaft and the thrust plate,
between an outer peripheral part at the base end of the shaft and an inner peripheral part at the open end of the hub is formed a seal part in which a larger clearance is formed between the shaft and the hub than a clearance in the hydrodynamic radial bearing and in which the oil surface is positioned,
an oil surface adjusting hole and a plug for sealing the hole are provided in the case opposite the seal part, and
a motor for rotating the hub is disposed between the outer peripheral part at the open end of the hub and the case.

2. The hard disk drive device according to claim 1, comprising means for biasing the hub toward the case.

3. The hard disk drive device according to claim 2, comprising a case cover spaced apart from the thrust plate of the hub to form a hydrodynamic air bearing between an outer surface of the thrust plate and the case cover.

4. The hard disk drive device according to claim 2, comprising a permanent magnet forming a rotor of the motor in an outer peripheral part at the open end of the hub, and a ferromagnetic ring disposed in the case axially opposite the permanent magnet.

5. The hard disk drive device according to claim 2, wherein the motor is formed by a rotor having a permanent magnet disposed in an outer peripheral part at the open end of the hub and a stator disposed in the case, the stator having a magnetic center axially offset toward a base end of the shaft from a magnetic center of the permanent magnet.

6. The hard disk drive device according to claim 1, comprising means for preventing the hub from slipping out of the shaft.

7. The hard disk drive device according to claim 6, comprising a case cover spaced apart from the thrust plate of the hub, and a pivot provided to either one of the case cover and the thrust plate in an axial center position of the hub.

8. The hard disk drive device according to claim 6, wherein the motor is formed by a rotor disposed in an outer peripheral part at the open end of the hub and a stator disposed in the case, and a shield plate is disposed above the stator such that the stator is positioned between the shield plate and the case, the shield plate having an inside diameter that is smaller than the outside diameter of the rotor or a plate interposed between the rotor and the hub.

9. The hard disk drive device according to claim 1, wherein a dent is formed in a top face of the shaft.

10. The hard disk drive device according to claim 9, wherein the dent in the top face of the shaft is provided with a high oil-wettability coat and/or other parts of the top face of the shaft are provided with a low oil-wettability coat.

11. The hard disk drive device according to claim 1, wherein one end face of the hub opposite the case includes an inclined end face slanted such that the distance between the hub and the case increases radially outwards, whereby a second seal part is formed between the inclined end face and the case.

12. The hard disk drive device according to claim 1, wherein an oil repellent is applied to part of the case opposite the seal part.

13. A fluid dynamic bearing spindle motor comprising:
a base with an upright shaft; and
a bottomed cylindrical sleeve coupled to the shaft, wherein
an oil is filled in a clearance between an inner surface of the sleeve and an outer surface of the shaft to form a hydrodynamic radial bearing between the inner periphery of the sleeve and the outer periphery of the shaft and a hydrodynamic thrust bearing between a top face of the shaft and an inner bottom face of the sleeve,
between an outer peripheral part at the base end of the shaft and an inner peripheral part at the open end of the sleeve is formed a seal part in which a larger clearance is formed between the shaft and the sleeve than a clearance in the hydrodynamic radial bearing and in which the oil surface is positioned,
an oil surface adjusting hole and a plug for sealing the hole are provided in the base opposite the seal part, and
a motor for rotating the sleeve is disposed between the outer peripheral part at the open end of the sleeve and the base.

14. The fluid dynamic bearing spindle motor according to claim 13, comprising means for biasing the sleeve toward the base.

15. The fluid dynamic bearing spindle motor according to claim 14, comprising a permanent magnet forming a rotor of the motor in an outer peripheral part at the open end of the sleeve, and a ferromagnetic ring disposed in the base axially opposite the permanent magnet.

16. The fluid dynamic bearing spindle motor according to claim 14, wherein the motor is formed by a rotor having a permanent magnet disposed in an outer peripheral part at the open end of the sleeve and a stator disposed in the base, the stator having a magnetic center axially offset toward a base end of the shaft from a magnetic center of the permanent magnet.

17. The fluid dynamic bearing spindle motor according to claim 13, comprising means for preventing the sleeve from slipping out of the shaft.

18. The fluid dynamic bearing spindle motor according to claim 17, wherein the motor is formed by a rotor disposed in an outer peripheral part at the open end of the sleeve and a stator disposed in the base, and a shield plate is disposed above the stator such that the stator is positioned between the shield plate and the base, the shield plate having an inside diameter that is smaller than the outside diameter of the rotor or a plate interposed between the rotor and the sleeve.

19. The fluid dynamic bearing spindle motor according to claim 13, wherein a dent is formed in a top face of the shaft.

20. The fluid dynamic bearing spindle motor according to claim 19, wherein the dent in the top face of the shaft is provided with a high oil-wettability coat and/or other parts of the top face of the shaft are provided with a low oil-wettability coat.

21. The fluid dynamic bearing spindle motor according to claim 13, wherein one end face of the sleeve opposite the base includes an inclined end face slanted such that the distance between the sleeve and the base increases radially outwards, whereby a second seal part is formed between the inclined end face and the base.

22. The fluid dynamic bearing spindle motor according to claim 13, wherein an oil repellent is applied to part of the base opposite the seal part.

* * * * *